(12) United States Patent
Kozlowski et al.

(10) Patent No.: US 11,787,310 B2
(45) Date of Patent: Oct. 17, 2023

(54) ELECTRICALLY CONDUCTIVE URETHANE FOAM

(71) Applicant: Magna Seating Inc., Aurora (CA)

(72) Inventors: Eric Kozlowski, Oakland Township, MI (US); Bruno Carraro, Ferndale, MI (US); Andrew M Vivian, Fayette, OH (US); Kaleb Kang, Chapel Hill, NC (US)

(73) Assignee: Magna Seating Inc., Aurora (CA)

( * ) Notice: Subject to any disclaimer, the term of this patent is extended or adjusted under 35 U.S.C. 154(b) by 611 days.

(21) Appl. No.: 16/760,953

(22) PCT Filed: Nov. 2, 2018

(86) PCT No.: PCT/US2018/058907
§ 371 (c)(1),
(2) Date: May 1, 2020

(87) PCT Pub. No.: WO2019/090048
PCT Pub. Date: May 9, 2019

(65) Prior Publication Data
US 2021/0178932 A1    Jun. 17, 2021

Related U.S. Application Data
(60) Provisional application No. 62/581,189, filed on Nov. 3, 2017.

(51) Int. Cl.
| | |
|---|---|
| *C08G 18/16* | (2006.01) |
| *B60N 2/00* | (2006.01) |
| *B60N 2/70* | (2006.01) |
| *C08G 18/18* | (2006.01) |
| *C08G 18/48* | (2006.01) |
| *C08G 18/76* | (2006.01) |
| *C08J 9/36* | (2006.01) |
| *H01B 1/20* | (2006.01) |

(52) U.S. Cl.
CPC ............... *B60N 2/002* (2013.01); *B60N 2/70* (2013.01); *C08G 18/161* (2013.01); *C08G 18/168* (2013.01); *C08G 18/1816* (2013.01); *C08G 18/1833* (2013.01); *C08G 18/485* (2013.01); *C08G 18/4816* (2013.01); *C08G 18/4825* (2013.01); *C08G 18/7664* (2013.01); *C08J 9/365* (2013.01); *H01B 1/20* (2013.01); *C08G 2110/0083* (2021.01); *C08J 2207/00* (2013.01); *C08J 2375/08* (2013.01); *C08J 2409/08* (2013.01)

(58) Field of Classification Search
CPC .. B60N 2/002; B60N 2/70; C08G 18/161168; C08G 18/1816; C08G 18/1833; C08G 18/4816; C08G 18/4825; C08G 18/485; C08G 18/7664; C08G 2110/0083; C08J 9/365; C08J 2207/00; C08J 2375/04; C08J 2375/08; C08J 2409/08; H01B 1/20
See application file for complete search history.

(56) References Cited

U.S. PATENT DOCUMENTS

| | | |
|---|---|---|
| 3,732,538 A | 5/1973 | Gillund et al. |
| 4,231,901 A | 11/1980 | Berbeco |
| 4,301,040 A | 11/1981 | Berbeco |
| 4,489,913 A | 12/1984 | Gurgiolo et al. |
| 5,060,527 A | 10/1991 | Burgess |
| 5,082,870 A | 1/1992 | Fukuda et al. |
| 6,291,568 B1 | 9/2001 | Lussey |
| 6,529,122 B1 | 3/2003 | Magnussen et al. |
| 7,205,505 B2 | 4/2007 | Diemer et al. |
| 7,594,442 B2 | 9/2009 | Kaiserman et al. |
| 9,326,903 B2 | 5/2016 | Locke |

FOREIGN PATENT DOCUMENTS

| | | | |
|---|---|---|---|
| CA | 2849341 A1 * | 5/2013 | ........... C04B 16/082 |
| JP | S57115433 | 7/1982 | |
| JP | S5929119 | 2/1984 | |
| JP | 2001164078 | 6/2001 | |

* cited by examiner

*Primary Examiner* — John M Cooney
(74) *Attorney, Agent, or Firm* — Miller Canfield

(57) ABSTRACT

A high durability electrically conductive urethane foam acts as a variable resistor such that as the foam deflects, conductive particles get closer together, causing electrical resistance to decrease. The electrically conductive foam is further integrated into an automotive seat sensor system.

8 Claims, 3 Drawing Sheets

US 11,787,310 B2

ELECTRICALLY CONDUCTIVE URETHANE FOAM

CROSS-REFERENCE TO RELATED APPLICATIONS

This application claims priority to U.S. Provisional Application No. 62/581,189, filed on Nov. 3, 2017.

BACKGROUND OF THE INVENTION

1. Field of the Invention

The present invention relates to a polyurethane foam having electrically conductive characteristics, More particularly, the invention relates to an electrically conductive urethane foam with improved durability and integrated with an automotive seat permittivity sensor.

2. Description of Related Art

Various sensor systems integrated into automotive seats are known in the art, One known system for recognizing the occupancy of a seat contains measurement strips of electrically conductive polyurethane passing through a seat cushion and connected to a computer for evaluation.

Other sensors using a layer of an electrically conductive cellular foam material or similar materials are also known in the art. An example known tactile sensor comprises, in part, a first layer including an electrode, a second layer of electrically conductive cellular foam material having an electrical resistance which varies in dependence upon deformation of the foam, and an electrically conductive third layer having elastomeric properties. Another known tactile sensor comprises, in part, an upper layer assembled with a lower layer of conductive foam elastomer, a first electrode in contact with a top surface of the upper layer, and a second electrode in contact with a bottom surface of the lower layer.

However, all of these examples may have limited durability and performance in an automotive seating application due to the properties of available conductive foams. Current conductive foams may have a poor polyurethane base structure. The current foams may be subject to quick mechanical breakdown such that these foams may be unsuitable for use in automotive seating. These foams may have poor hysteresis and may have thickness distortion. Further, these properties generally may result in poor durability when used for automotive seating and similar applications.

It is desirable, therefore, to improve the properties of conductive foam. New novel applications are possible if sufficient conductivity and durability is achieved. It is also desirable to have foam that can be constructed to act as a variable resistor such that as the foam deflects, conductive particles get closer together, causing electrical resistance to decrease. Further, it is desirable to improve the durability of the foam so that variable resistance foam may be employed in high-loading applications such as automotive seating. Finally, it is desirable to integrate an electrically conductive foam as part of an automotive seat sensor system.

SUMMARY OF THE INVENTION

A high durability electrically conductive urethane foam acts as a variable resistor such that as the foam deflects, conductive particles get closer together, causing electrical resistance to decrease. The electrically conductive foam is further integrated into an automotive seat sensor system.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1 to 4 illustrate an electrically conductive foam integrated into an automotive seat sensor system according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, cross section views of automotive seat cushion assemblies, flexible printed circuit assemblies, and foam are shown to illustrate their layers and components, but such views are not necessarily to scale. Referring to the Figures, like numerals indicate like or corresponding parts throughout the several views.

Figure 1:
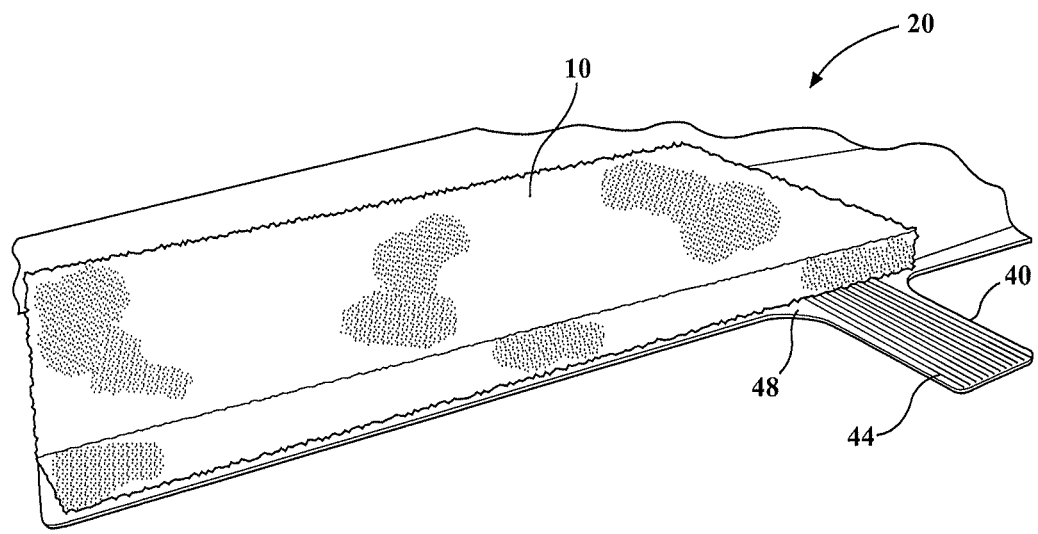
FIG. 1 is side perspective view of a permittivity sensor according to an embodiment of the invention.
Figure 3:
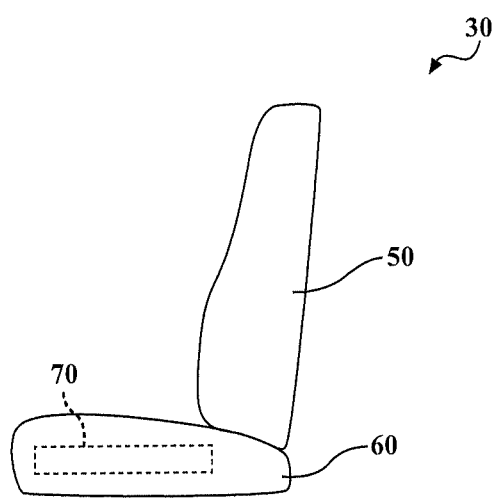
FIG. 3 is a side view of an automotive seat according to an embodiment of the invention.

FIG. 1 illustrates a side perspective view of an electrically conductive foam 10 integrated into an automotive seat permittivity sensor 20 according to one embodiment of the present disclosure. The permittivity sensor 20 provides a way to measure the amount of compression of an automotive seat 30 (shown in FIG. 3) for use in an automotive vehicle. As shown in FIG. 1, the permittivity sensor 20 comprises, in part, the electrically conductive foam 10 assembled with a flexible printed circuit 40. The flexible printed circuit 40 may comprise an electrical circuit 44 typically printed on a suitable base film 48 such as a polyethylene terephthalate film (PET) or a polyimide film (PI).

Electrically conductive urethane foam is a polyurethane foam that can exhibit electrically conductive characteristics and is very desirable in a number of applications. Foams can be classified as one of insulative, mild electrostatic conductivity, and conductive. The preparation and processing of the foam determines the electrical conductivity characteristics. No special preparation is required for insulative foam. Mild electrostatic conductivity can be obtained with a foam by embedding and/or coating with electrically conductive particles. These particles are often ionic salts. In order to obtain a conductive foam, very high conductivity is obtained through special particles coated and bonded on the surface of the foam. With this method resistance levels of 3 ohms to 3,000 ohms can be achieved.

Some example conductive foams are electrostatic conductors used in the electronics industry. These known conductive foams may be used to protect integrated chips from shorting out from an errant static charge and may be used as a manufacturing aid in the chip manufacturing plants. These foams may be capable of very high resistance levels in excess of $1.0 \times 10^6$ ohms and may be surface coated foams and/or may have ionic salts impregnated into the foam.

However, current conductive foams may have a poor polyurethane base structure. The current foams may be subject to quick mechanical breakdown such that these foams may be unsuitable for use in automotive seating. These foams may have poor hysteresis and may have thickness distortion. Further, these properties generally may result in poor durability when used for automotive seating and similar applications.

If sufficient conductivity and durability are achieved, then new novel applications are possible. As discussed above, these conductive foams can be constructed to act as a variable resistor. As the conductive foam deflects, conductive particles get closer together, causing electrical resistance to decrease. With sufficient durability, variable resistance foam can be employed in high-loading applications (i.e. automotive seating). Since deflection of the foam is directly related to the load that the foam is experiencing, conductive foam of the present disclosure can now be used as a key element in a pressure sensing system for automotive seating. The conductive foam according to the present disclosure has high resiliency, high durability, can be very responsive to pressure changes, and can rebound/respond in the millisecond timeframe.

A novel electrically conductive foam according to one embodiment of the present invention is a high durability foam having very low hysteresis, high resiliency, very low compression set, and maintains these properties over the life of a vehicle. Further, this novel conductive foam has high electrical conductivity that varies with deflection. Special conductive particles are securely bonded to the base foam. A unique binder loading keeps the conductive particles attached but does not interfere with foam softness and conductive performance.

A preferred embodiment of this novel conductive foam exhibits very high durability with a hysteresis load loss of about 6.4% under constant force pounding and with height loss under about 1% though life testing, when tested per ASTM D3574-11-13. Further, this conductive foam has a high resiliency when tested with 305 mm ball rebound testing per ASTM D3574-11-H.

Referring to Table 1 shown below, a preferred base foam formula comprises, in parts per hundred polyol (PPHP), about 95 PPHP high reactivity 6000 molecular weight capped triol polyether polyol such as Voranol® CP-6001 manufactured by DOW®, about 3 PPHP glycerine/sucrose initiated polyether polyol such as Carpol® GSP-355 manufactured by Carpenter®, about 2 PPHP glycerin-initiated polyether polyol such as Carpol® GP-5171 manufactured by Carpenter®, about 0.425 PPHP silicone surfactant such as Tegostab® B-8734 manufactured by Evonik®, and about 0.33 PPHP amine catalyst 1,4-Diazabicyclo[2.2.2]octane solution such as Dabco® 33LX manufactured by Evonik®, about 0.175 PPHP amine catalyst bis-(2-dimethylaminoethyl)ether in dipropylene glycol such as Jeffcat® ZF-22 manufactured by Huntsman®, about 0.055 PPHP delayed-action catalyst made up of bis-(2-dimethylaminoethyl) ether in dipropylene glycol which has been partially neutralized with formic acid such as Jeffcat® ZF-54 manufactured by Huntsman®, and about 1.85 PPHP water. This preferred formula has an (A+B) Ratio @ 100 Index of about 38.6. The preferred base foam formula further comprises diphenylmethane diisocyante having a free NCO content of about 29.4% and a functionality of about 2.15 such as SUPRASEC® 7007 manufactured by Huntsman®. The preferred base foam is manufactured using generally known polyurethane foam manufacturing methods.

TABLE 1

Preferred Base Foam Formula

| Manufacturer | Chemical | PPHP |
| --- | --- | --- |
| DOW ® | Voranol ® CP-6001 | 95 |
| CARPENTER ® | CARPOL ® GSP-355 | 3 |
| CARPENTER ® | CARPOL ® GP-5171 | 2 |
| EVONIK ® | TEGOSTAB ® B-8734 | 0.425 |
| HUNTSMAN ® | JEFFCAT ® ZF-22 | 0.175 |
| HUNTSMAN ® | JEFFCAT ® ZF-54 | 0.055 |
| EVONIK ® | DABCO ® 33LX | 0.33 |
|  | WATER | 1.85 |
|  | (A + B) Ratio @ 100 INDEX | 38.6 |
| HUNTSMAN ® | SUPRASEC ® 7007 NCO % 29.4/Functionality 2.15 |  |

A preferred embodiment of the conductive foam is prepared by bonding high electrically conductive particles to the base foam using a latex binder according to the present disclosure. The preferred electrically conductive particles have a small sub-micron size with high electrical conductivity such that low loading levels are needed to achieve desired conductivity. An example of preferred conductive particles is very pure carbon black such as Ketjenblack® EC-600JD manufactured by AkzoNobel®. A preferred latex binder is a carboxylated styrene-butadiene emulsion to securely bind the conductive particles to the base foam and which stays flexible through the life of the product. A preferred source of a suitable latex binder is Rovene® 4180 manufactured by Mallard Creek Polymers®. A preferred dispersing agent comprises, in part, 1-methoxy-2-propylacetate and n-butanol. A preferred source of a suitable dispersing agent is Efka® PX 4310 manufactured by BASF®.

An electrical bonding agent formula for a preferred embodiment of an enhanced conductive coating comprises: about 100 parts water, about 1.75 parts latex binder such as Rovene® 4180, about 1 part conductive particles such as Ketjenblack® EC-600JD, and about 0.5 parts dispersing agent such as Efka® PX4310. The preferred conductive coating is prepared using generally known manufacturing methods for mixing coatings.

The electrically conductive foam according to one embodiment of the present invention is formed by a wet add-on application of the enhanced conductive coating to the base foam until the base foam is thoroughly saturated. The saturated base foam may be pinch-rolled to remove excess coating material. The remaining wet add-on for about a 6 mm thick base foam part is about 259 g/ft² (2788 g/m²). The saturated base foam may be oven cured at about 180° F. until dry.

Figure 2:
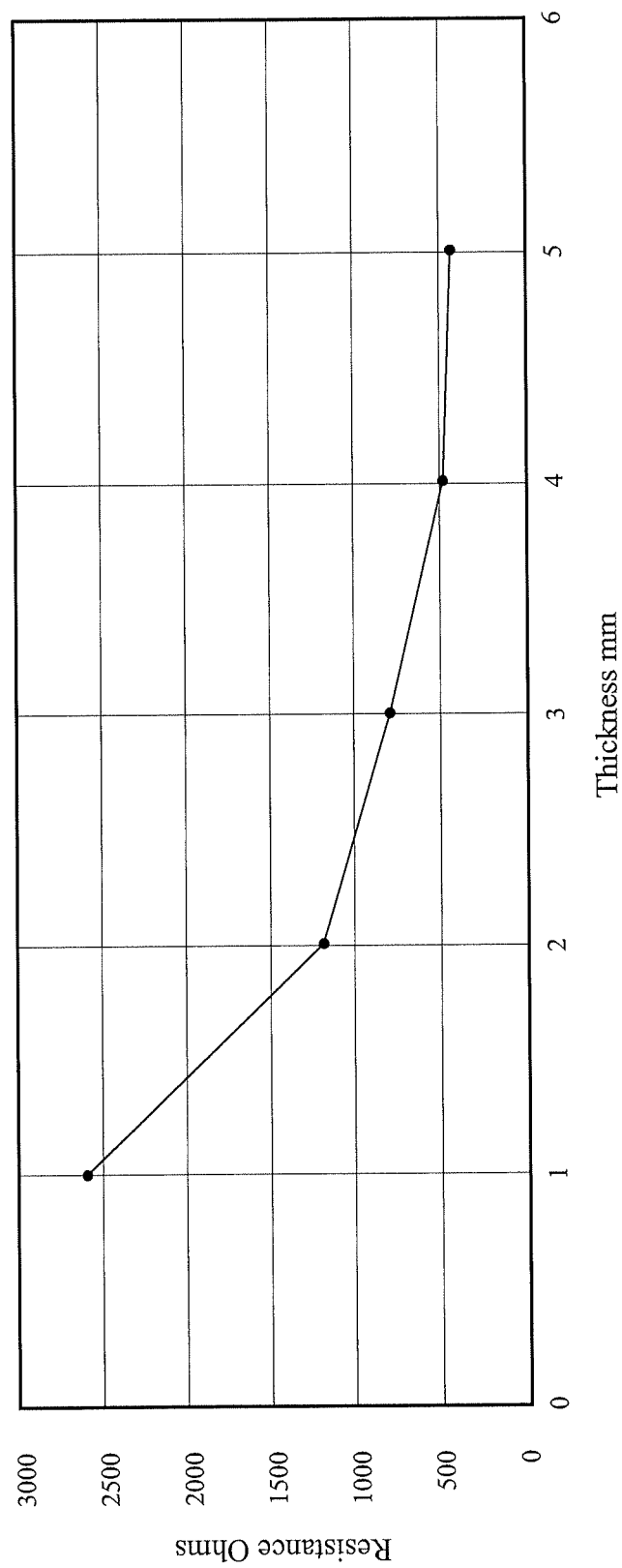
FIG. 2 is a chart showing electrical performance of a conductive foam according to an embodiment of the invention.

As shown in FIG. 2, the electrically conductive foam, prepared according to the above disclosure, has improved electrical performance when prepared according to the above-preferred embodiment. FIG. 2 shows the change in resistance (ohms) as the thickness (mm) of the conductive foam is reduced by compression. This results in a conductive foam suitable for use in automotive applications. Further, electrically conductive foam according to the present disclosure may be integrated into a seat sensor, as described in the following embodiments.

Figure 4:
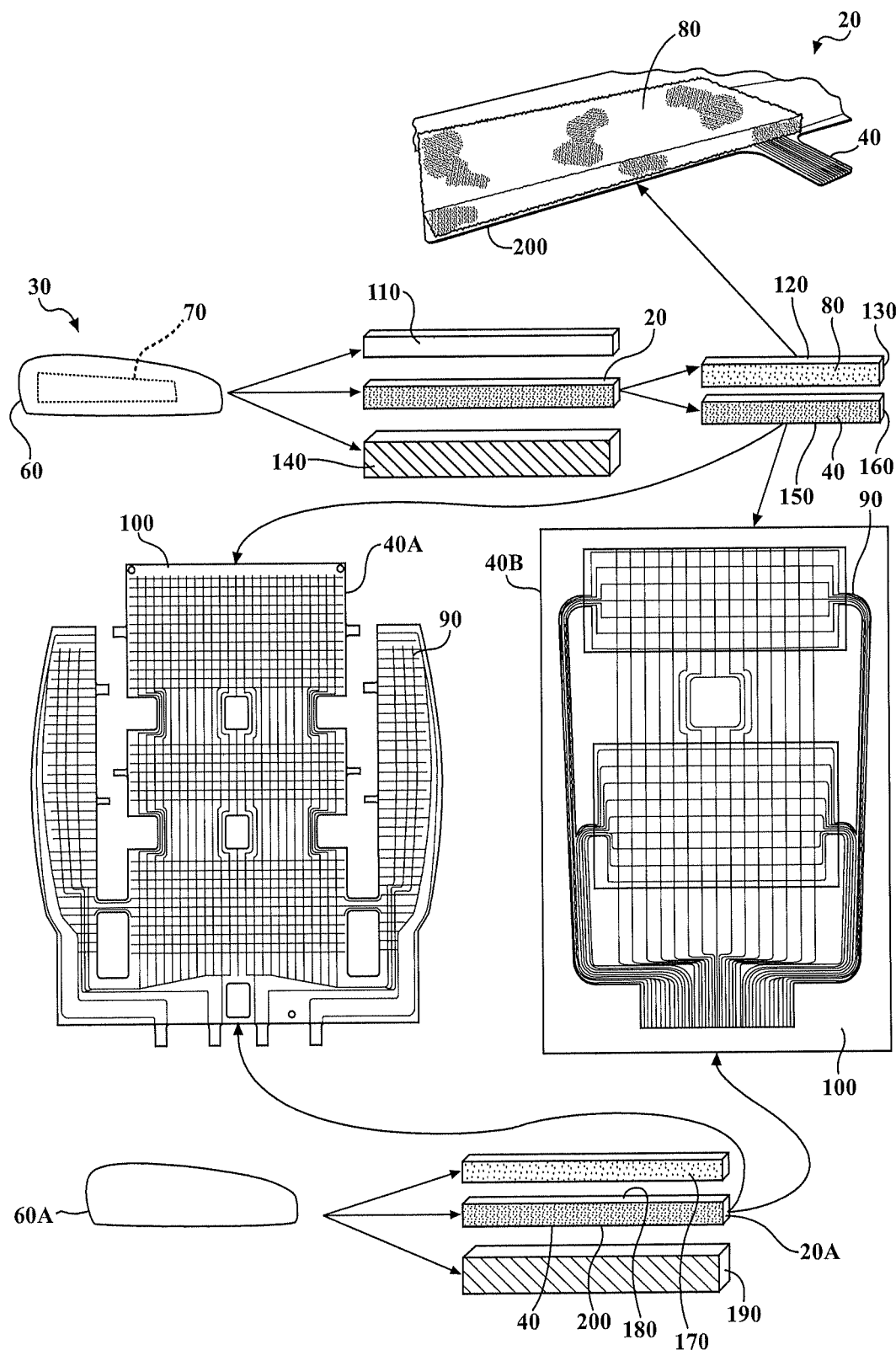
FIG. 4 is a schematic view of first and second embodiments of a seat cushion having a permittivity sensor according to embodiments of the present invention.

One embodiment of an automotive seat has a cushion in which a portion of a foam pad is filled with conductive particles. An example automotive seat 30 shown in FIG. 3 generally comprises a seat back 50 and a seat cushion 60 and may be configured as a front and/or rear seat of an automotive vehicle. The seat cushion 60 may be constructed with a foam pad 70 in which a portion of the foam pad 70 is filled with conductive particles. As shown schematically in FIG. 4, a permittivity sensor 20 may be assembled with the automotive seat 30 and may interface with the foam pad 70. The permittivity sensor 20 may comprise a layer of conductive foam 80 attached to a PET/PI flexible printed circuit 40 as shown in FIG. 4. Preferably, the layer of conductive foam 80 comprises electrically conductive foam having a base foam formula as shown in Table 1 coated with the enhanced conductive coating of the present disclosure. The PET/PI flexible printed circuit 40 may comprise any flexible printed circuit configuration suitable for an intended application. Exemplary flexible printed circuit alternatives 40A and 40B are illustrated in FIG. 4. PET/PI flexible printed circuits 40, 40A, 40B generally comprise an electrical circuit 90 printed onto a polyethylene terephthalate film (PET) or a polyimide film (PI) 100.

A first embodiment of a seat cushion 60 according to the present disclosure comprises a first polyurethane (PU) foam slab 110 mounted on an upper surface 120 of the conductive foam pad 80 which forms an upper layer 130 of the permittivity sensor 20, as shown in FIG. 4. The seat cushion 60 further comprises a second polyurethane (PU) foam pad 140 assembled with a lower surface 150 of a lower layer 160 of the permittivity sensor 20, i.e., assembled adjacent to the lower surface 150 of the PET/PI flexible printed circuit 40, 40A, 40B.

Also shown in FIG. 4 is a second embodiment of a seat cushion 60A according to the present disclosure. The seat cushion 60A comprises a conductive polyurethane (PU) foam slab 170 mounted on an upper surface 180 of a permittivity sensor 20A. The permittivity sensor 20A may comprise the layer of conductive polyurethane foam slab 170 attached to a PET/PI flexible printed circuit 40 as similarly shown for permittivity sensor 20 in FIG. 4. The seat cushion 60A further comprises a polyurethane (PU) foam pad 190 assembled with a lower surface 200 of the permittivity sensor 20A, i.e., assembled adjacent to a lower surface 200 of the PET/PI flexible printed circuit 40. As in the first embodiment of the seat cushion 60, the PET/PI flexible printed circuit 40 of the second embodiment of the seat cushion 60A may comprise any flexible printed circuit configuration suitable for an intended application such as exemplary flexible printed circuit alternatives 40A and 40B illustrated in FIG. 4.

One benefit of the conductive foam, prepared according to the above disclosure, is improved durability combined with high resiliency. A second benefit of the disclosed conductive foam is improved electrical conductivity. The improved electrical conductivity in combination with the high resiliency results in a foam that may be very responsive to pressure changes and can rebound/respond in the millisecond timeframe. These benefits result in a conductive foam which is suitable for automotive seating applications since these applications require high durability as well as high resiliency.

An additional benefit is integrating this improved conductive foam, prepared according to the above disclosure, into a seat sensor, such as a permittivity sensor, for an automobile seat. Further, seat cushion assemblies comprising, in part, a permittivity sensor and the conductive foam, are disclosed which benefit from the performance characteristics of the improved conductive foam.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A conductive foam for an automotive seat assembly, said conductive foam comprising:
    a base polyurethane foam;
    said base polyurethane foam being coated and/or saturated with an electrical bonding agent using a wet add-on application; and
    said saturated base polyurethane foam being oven cured until dry;
    wherein said electrical bonding agent comprises carbon black conductive particles, a carboxylated styrene-butadiene emulsion latex binder, and a dispersing agent, and
    wherein said base polyurethane foam is formed from a material comprising about 95 PPHP (parts per hundred polyol) high reactivity 6000 molecular weight capped triol polyether polyol, about 3 PPHP glycerine/sucrose initiated polyether polyol, about 2 PPHP glycerin-initiated polyether polyol, and about 0.425 PPHP silicone surfactant.

2. The conductive foam as set forth in claim 1, wherein said base polyurethane foam is formed from a material comprising about 0.33 PPHP amine catalyst 1,4-Diazabicyclo[2.2.2]octane solution, about 0.175 PPHP amine catalyst bis-(2-dimethylaminoethyl)ether in dipropylene glycol, about 0.055 PPHP delayed-action catalyst made up of bis-(2-dimethylaminoethyl) ether in dipropylene glycol which has been partially neutralized with formic acid, and about 1.85 PPHP water.

3. The conductive foam as set forth in claim 2, wherein said base polyurethane foam is formed from a material comprising diphenylmethane diisocyante having a free NCO content of about 29.4% and a functionality of about 2.15.

4. The conductive foam as set forth in claim 3, wherein said electrical bonding agent comprises about 100 parts water, about 1.75 parts carboxylated styrene-butadiene emulsion latex binder, about 1 part carbon black conductive particles, and about 0.5 parts dispersing agent.

5. The conductive foam as set forth in claim 4, wherein said automotive seat assembly comprises a layer of said conductive foam.

6. The conductive foam as set forth in claim 5, wherein said automotive seat assembly comprises a permittivity sensor having said layer of said conductive foam assembled with an upper surface of a flexible printed circuit.

7. The conductive foam as set forth in claim 6, wherein said automotive seat assembly comprises a first layer of polyurethane foam assembled with a lower surface of said flexible printed circuit.

8. The conductive foam as set forth in claim 7, wherein said automotive seat assembly comprises a second layer of polyurethane foam assembled with an upper surface of said conductive foam.

\* \* \* \* \*